(12) United States Patent
Takemura et al.

(10) Patent No.: US 8,704,636 B2
(45) Date of Patent: Apr. 22, 2014

(54) INFORMATION PROCESSING APPARATUS, COMMUNICATION APPARATUS, AND PROGRAM

(75) Inventors: Toshiharu Takemura, Tokyo (JP); Tadashi Morita, Tokyo (JP); Mitsuhiro Nakamura, Tokyo (JP)

(73) Assignee: Sony Corporation (JP)

( * ) Notice: Subject to any disclaimer, the term of this patent is extended or adjusted under 35 U.S.C. 154(b) by 799 days.

(21) Appl. No.: 12/924,941

(22) Filed: Oct. 8, 2010

(65) Prior Publication Data

US 2011/0090044 A1    Apr. 21, 2011

(30) Foreign Application Priority Data

Oct. 21, 2009   (JP) ................. P2009-242243

(51) Int. Cl.
*G06K 1/00*    (2006.01)
(52) U.S. Cl.
USPC ..................... 340/5.8; 340/10.51
(58) Field of Classification Search
USPC .......... 340/5.8, 10.51; 235/492; 711/164, 173
See application file for complete search history.

(56) References Cited

U.S. PATENT DOCUMENTS

| | | | | |
|---|---|---|---|---|
| 5,408,082 A | * | 4/1995 | Takagi et al. | 235/492 |
| 5,966,082 A | * | 10/1999 | Cofino et al. | 340/10.51 |
| 6,101,477 A | * | 8/2000 | Hohle et al. | 705/5 |
| 2006/0101136 A1 | * | 5/2006 | Akashika et al. | 709/223 |

FOREIGN PATENT DOCUMENTS

| | | |
|---|---|---|
| JP | 06-231321 A | 8/1994 |
| JP | 2005-242553 A | 9/2005 |

* cited by examiner

*Primary Examiner* — Edwin Holloway, III
(74) *Attorney, Agent, or Firm* — Lerner, David, Littenberg, Krumholz & Mentlik, LLP

(57) ABSTRACT

An information processing apparatus includes: a storage block configured to store a first region as part of a layer structure; an execution block which, in response to a designation command transmitted by a communication apparatus to designate the creation of a second region as a lower layer of the first region, performs a region creation process for creating the second region as the lower layer of the first region; and a transmission block which, if the region creation process is stopped, then transmits first information indicating whether or not the second region is already created to the communication apparatus, in response to a request from the communication apparatus.

10 Claims, 7 Drawing Sheets

INFORMATION PROCESSING APPARATUS, COMMUNICATION APPARATUS, AND PROGRAM

CROSS-REFERENCE TO RELATED APPLICATION

The present application claims priority from Japanese Patent Application No. JP 2009-242243 filed in the Japanese Patent Office on Oct. 21, 2009, the entire content of which is incorporated herein by reference.

BACKGROUND OF THE INVENTION

1. Field of the Invention

The present invention relates to an information processing apparatus, a communication apparatus, and a program. More particularly, the invention relates to an information processing apparatus, a communication apparatus, and a program preferably used for carrying out an additional registration process whereby a new region is additionally registered (created) on a memory of the information processing apparatus in accordance with instructions from the communication apparatus.

2. Description of the Related Art

Usually, during their production stage, IC (integrated circuit) cards such as Felica (registered trademark) card have a memory area therein initialized typically through physical formatting. An initial registration process is then performed on the initialized memory area so as to register (create) area regions as well as service regions in the area.

As shown illustratively in FIG. 1, the initial registration process involves first creating an area region A0 in the memory area of the IC card, followed by an area region A1 created as a lower layer under the area region A0, and by a service region S11 under the area region A1. The area regions each refer to a region that allows either another area region or a service region to be created as a lower layer thereunder.

Each area region is defined by area definition information stored in the memory area of the IC card. When such area definition information is written to the memory area of the IC card, a corresponding area region is crated in the memory area.

The area definition information is information which includes an area range indicating the range of the corresponding area region found in the memory area, an area code for uniquely identifying the area region, an area key for creating an authentication key used for authentication purposes upon access to the area region, a key version of the area key, and an allocation size indicating the size allocated to the area region.

The service region refers to a memory area that stores user data (e.g., electronic money) necessary for offering the user of the IC card a predetermined service (e.g., payment by electronic money). The service region is defined by service definition information stored in the memory area of the IC card. When such service definition information is written to the memory area of the IC card, a corresponding service region is created in the memory area.

The service definition information is information which includes a service code for uniquely identifying the corresponding service area (found in the memory area), a service key for generating an authentication key used for authentication purposes upon access to the service region, a key version of the service key, and an allocation size indicating the size allocated to the service region.

The user may have the user data stored in the service region S11 of the IC card (in which the service region S11 was created by the initial registration process) for a read or a write operation by holding the IC card over a reader/writer or like equipment offering the service in question. More specifically, if the IC card is utilized as part of an electronic money system, the user may get the IC card charged with prepaid money or have the purchase price of a product deducted from the prepaid money.

It might happen that the user wants to receive a new service using the same IC card. For example, the user may wish to add an electronic money service or a commuter ticket service to the IC card currently used as an identification card. If that is the case, regions corresponding to the newly added service need to be created anew in the memory area of the IC card.

In that case, as shown in FIG. 1, an additional registration process is carried out in a manner creating an area region A2 as a lower layer under the previously created area region A0, an area region A21 under the area region A2, and a service region S211 under the area region A21.

While the additional registration process is underway, the ongoing process might be stopped halfway illustratively because of a disruption of power supply to the IC card. In particular, if the IC card is a so-called noncontact type IC card powered by electromagnetic waves coming from a reader/writer, there is a higher possibility that power supply can be disrupted than if the IC card is a contact type IC card powered via a connection terminal, whereby the additional registration process tends to be stopped.

If the additional registration process is stopped halfway, it might happen that some regions have yet to be created while others have already been created. For example, the area region A2 may have been created but the area regions A21 and service region S211 thereunder have yet to be created.

Usually, if the initial registration process is stopped halfway illustratively because of a disruption of power supply to the IC card, the memory area of the IC card is initialized back to the state prior to the additional registration process. The initial registration process is then carried out again.

Similarly, if the additional registration process is stopped halfway, the memory area of the IC card may conceivably be initialized back to the state prior to the additional registration process (i.e., a state in which the area regions A0 and A1 as well as the service region S11 are registered) as in the case of the initial registration process. Then the additional registration process may be carried out again.

However, if the memory area of the IC card were initialized, not only the regions already created during the additional registration process (e.g., area region A2) but also the area regions A0 and A1 as well as the service region S11 created during the initial registration process would be deleted.

In the case of the IC chip mounted on a mobile phone (i.e., an IC chip offering functions equivalent to those of the above-described IC card), there exists a particular region registration method. According to this method, when new area regions A2 and A21 as well as a service region S211 are to be added to the IC chip, the area definition information and service definition information associated with these regions are all saved temporarily into a volatile memory of the mobile phone so that the saved information will later be moved altogether from the volatile memory into the memory area of the chip for registration.

There also exist techniques whereby, immediately before the additional registration process is stopped halfway, the regions about to be created in the memory area of the IC card are compared with the regions already created therein. According to the techniques, the result of the comparison is used as the basis for determining which regions were stopped halfway in their creation during the additional registration process. One such determination technique is disclosed illustratively in Japanese Patent Laid-open No. 2005-242553.

SUMMARY OF THE INVENTION

According to the existing region registration method, if the power supply is disrupted, the area definition information and service definition information saved temporarily in the volatile memory are deleted and the state in effect before the region registration method was performed (i.e., a state in which the area regions A0 and A1 as well as the service region S11 are registered) is restored. Thus there is no need to initialize the memory area of the IC card.

However, according to the existing region registration method, a large amount of hardware resources (especially the volatile memory) is needed for the process. Compared with the IC chip mounted on the mobile terminal, the IC cared has only a limited amount of available volatile memory capacity. That means the adoption of the existing region registration method for the IC card is not a practical option.

Also, according to the existing determination technique, it is possible to determine where the ongoing additional registration process was stopped halfway so that the process would be resumed where it was halted. However, the technique has the disadvantage of having to perform a different kind of processing depending on where the additional registration process was stopped halfway.

The present invention has been made in view of the above circumstances and provides arrangements whereby the regions about to be created but missed in a memory through a halfway-stopped additional registration process are recovered using the same steps as those of the additional registration process regardless of where the additional registration process was stopped halfway.

In carrying out the present invention and according to one embodiment thereof, there is provided an information processing apparatus or a program including the steps of causing a computer to function as the information processing apparatus. The information processing apparatus includes: a storage block configured to store a first region as part of a layer structure; an execution block configured such that in response to a designation command transmitted by a communication apparatus to designate the creation of a second region as a lower layer of the first region, the execution block performs a region creation process for creating the second region as the lower layer of the first region; and a transmission block configured such that if the region creation process is stopped, then the transmission block transmits to the communication apparatus first information indicating whether or not the second region is already created, in response to a request from the communication apparatus; wherein, upon receipt of the designation command transmitted by the communication apparatus in response to the transmitted first information indicating that the second region is not created, the execution block performs the region creation process regardless of the stopped state of the region creation process.

Preferably, if the second region is determined to be created already, then the transmission block may transmit second information in response to a request from the communication apparatus, the second information indicating whether or not region information about the second region matches the region information designated by the communication apparatus; and, upon receipt of the designation command from the communication apparatus in response to the transmission of the first information indicating that the second region is already created and of the second information indicating that the two kinds of region information match one another, the execution block may perform the region creation process regardless of the stopped state of the region creation process.

Preferably, the transmission block may transmit the second information indicating whether or not the two kinds of region information match one another at least in terms of a key to the already created second region, a key version of the key, or an allocation size denoting the storage capacity of the already created second region.

Preferably, if the region creation process is performed to create a plurality of the second regions in the layer structure, then the transmission block may transmit the first information indicating whether or not the lowest of the plurality of second regions in the layer structure is already created, in response to a request from the communication apparatus.

Preferably, the execution block may perform mutual authentication with the communication apparatus based on a key to the first region, before carrying out the region creation process.

According to one preferred embodiment of the present invention outlined above, in response to the designation command transmitted by the communication apparatus to designate the creation of the second region as a lower layer of the first region, the region creation process is performed to create the second region as the lower layer of the first region. If the region creation process is stopped, then first information is transmitted to the communication apparatus indicating whether or not the second region is already created, in response to the request from the communication apparatus. Upon receipt of the designation command transmitted by the communication apparatus in response to the transmitted first information indicating that the second region is not created, the region creation process is performed regardless of the stopped state of the process.

According to another preferred embodiment of the present invention, there is provided a communication apparatus or a program including the steps of causing a computer to function as the communication apparatus. The communication apparatus includes: a transmission block configured to transmit a designation command for designating the creation of a second region as a lower layer of a first region as part of a layer structure stored in a memory of an information processing apparatus; a request block configured to request the transmission of first information indicating whether or not the second region is already created if a region creation process performed by the information processing apparatus in response to the designation command to create the second region as the lower layer of the first region is stopped; a reception block configured to receive the first information transmitted in response to the request from the request block; and a determination block configured to determine whether or not the second region is already created based on the received first information; wherein the transmission block again transmits the designation command if the second region is not determined to be created.

According to the another preferred embodiment of the present invention outlined above, the designation command is transmitted to designate the creation of the second region as the lower layer of the first region as part of the layer structure stored in the memory of the information processing apparatus. A request is then made to request the transmission of the first information indicating whether or not the second region is already created if the region creation process performed by the information processing apparatus in response to the designation command to create the second region as the lower layer of the first region is stopped. The first information is received, which was transmitted in response to the request for the transmission of that information. A determination is then made to determine whether or not the second region is already created based on the received first information. The designation command is transmitted if the second region is not determined to be created.

According to the present invention embodied as outlined above, the regions yet to be registered can be recovered in the same steps as those of an additional registration process regardless of the stopped state of that additional registration process.

DETAILED DESCRIPTION OF THE PREFERRED EMBODIMENTS

Some preferred embodiments of the present invention will now be described under the following headings:

1. Preferred embodiment (which creates again all regions of which the creation was designated by an additional registration process); and 2. Variations.

<1. Preferred Embodiment>

Typical Configuration of the Communication System 1

Figure 2:
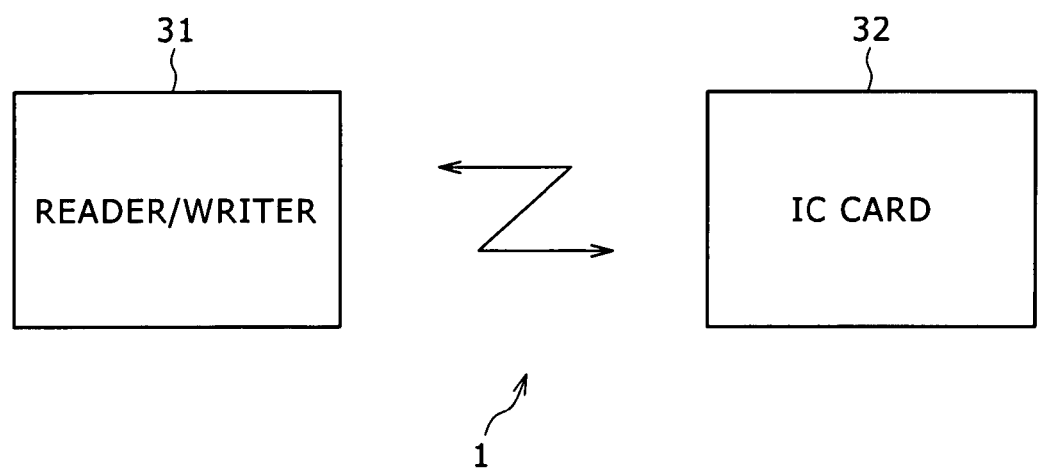
FIG. 2 is a block diagram showing a typical configuration of a communication system to which an embodiment of the present invention is applied.

FIG. 2 shows a typical configuration of a communication system 1 to which the present invention is applied. The communication system 1 is made up of a reader/writer 31 and a noncontact IC card 32 (simply called the IC card 32 hereunder where appropriate). Noncontact proximity wireless communication is carried out between the reader/writer 31 and the IC card 32. In response to a command from the reader/writer, the IC card 32 performs an additional registration process for adding new memory regions.

If the additional registration process is stopped halfway, the reader/writer 31 performs a creation designation process for designating the recovery (i.e., creation) of a region or regions to be added anew in the additional registration process regardless of the halfway-stopped state of the additional registration process.

In keeping with the creation designation process performed by the reader/writer 31, the IC card 32 carries out a creation process for recovering the regions to be added anew in the additional registration process.

The additional registration process, creation designation process, and creation process will be described later in reference to the flowcharts of FIGS. 5, 7 and 8, respectively.

[Typical Structure of the Reader/Writer 31]

Figure 3:
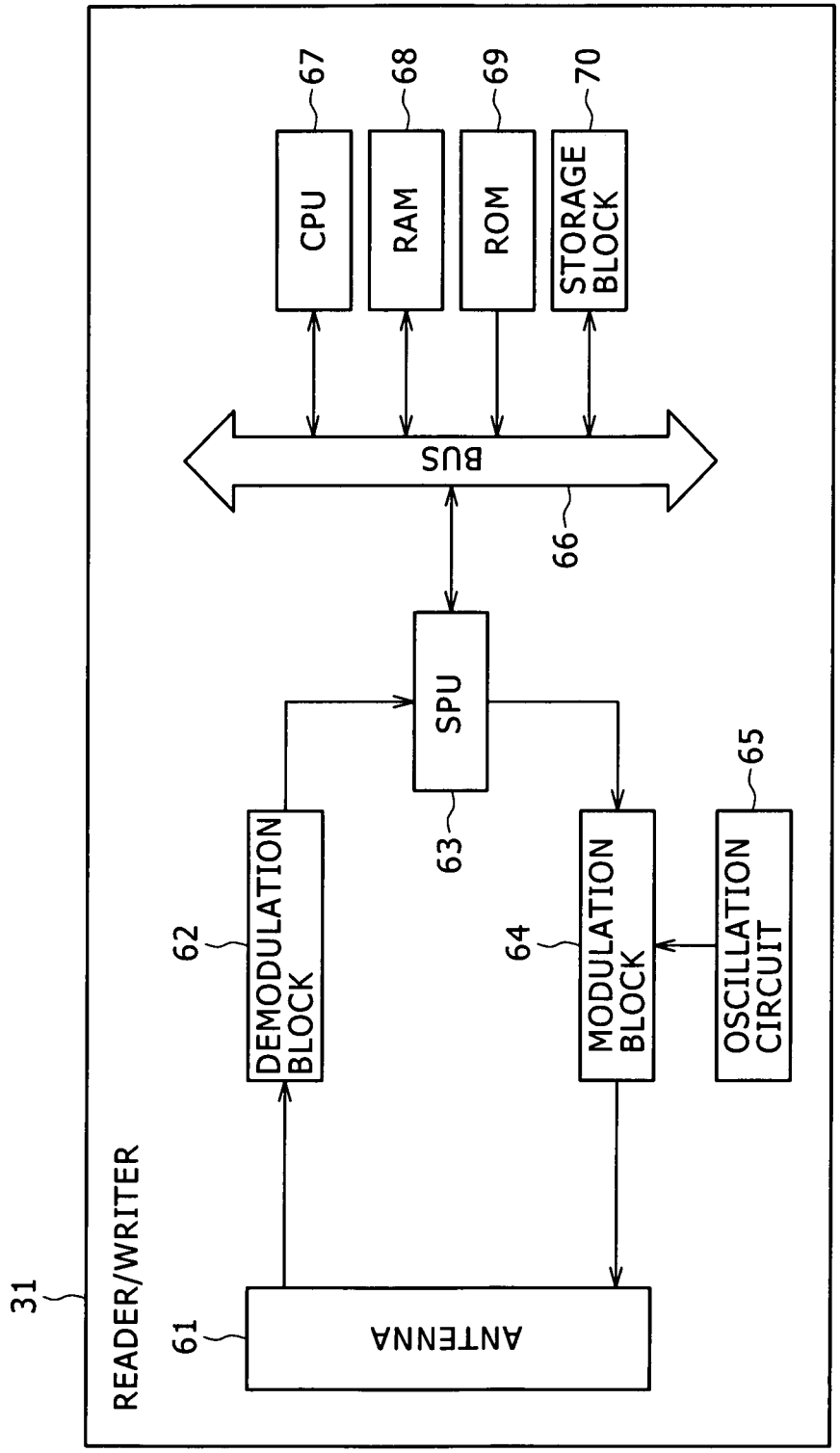
FIG. 3 is a block diagram showing a typical structure of a reader/writer.

FIG. 3 shows a typical structure of the reader/writer 31. The reader/writer 31 is made up of an antenna 61, a demodulation block 62, an SPU (signal processing unit) 63, a modulation block 64, an oscillation circuit 65, a bus 66, a CPU (central processing unit) 67, a RAM (random access memory) 68, a ROM (read only memory) 69, and a storage block 70. The SPU 63, CPU 67, RAM 68, ROM 69, and storage block 70 are interconnected by the bus 66.

The antenna 61 transmits a modulated signal coming from the modulation block 64 through noncontact proximity wireless communication. Also, the antenna 61 receives a modulated signal in the form of electromagnetic waves from another apparatus (e.g., IC card 32) and forwards the received signal to the demodulation block 62.

The demodulation block 62 demodulates the modulated signal coming from the antenna 61, and feeds a command or other data acquired from the demodulation to the SPU 63. The SPU 63 encodes the command or other data supplied from the CPU via the bus 66 and outputs the encoded data to the modulation block 64. Further, the SPU 63 decodes the command or other data coming from the demodulation block 62 and feeds the decoded data to the CPU 67.

The modulation block 64 modulates a carrier (i.e., through ASK modulation) fed from the oscillation circuit 65 using the command or the like from the SPU 63, and sends the modulated signal thus acquired to the antenna 61. The oscillation circuit 65 generates a carrier of a predetermined frequency and feeds the generated carrier to the modulation block 64.

The CPU 67 performs the creation designation process (to be discussed later in reference to FIG. 7) by loading a suitable program from the ROM 69 or storage block 70 into the RAM 68 for execution. The programs carried out by the CPU 67 may be updated.

While the CPU 67 is performing diverse processes, the RAM 68 temporarily accommodates halfway data that may occur during the processing. The ROM 69 stores various programs and data to be used by the CPU 67 for carrying out its processes.

The storage block 70 is composed of a so-called nonvolatile storage medium which is rewritable and which retains its recorded content when power is removed. Typically, the storage block 70 is constituted by a hard disk, a flash memory, an EEPROM (electrically erasable programmable read only memory), an MRAM (magneto-resistive random access memory), or a FeRAM (ferroelectric random access memory).

Also, in the predetermined region (e.g., area region) stored in the IC card 32, the storage block 70 stores keys (e.g., an area key) for generating an authentication key used for authentication upon creation of a new memory region.

[Typical Structure of the Ic Card 32]

Figure 4:
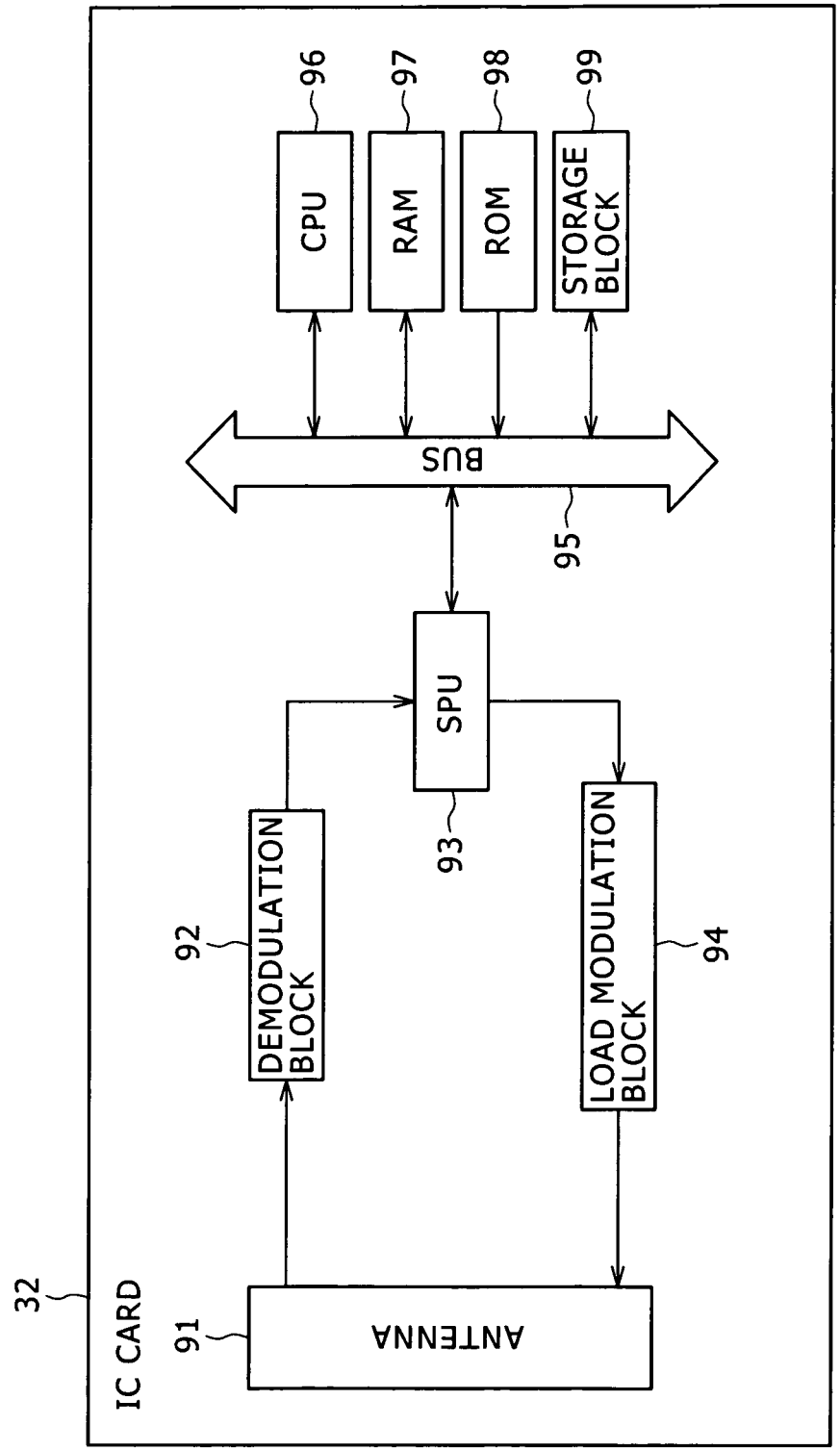
FIG. 4 is a block diagram showing a typical structure of an IC card.

FIG. 4 shows a typical structure of the IC card 32. The IC card 32 is made up of an antenna 91, a demodulation block 92, an SPU 93, a load modulation block 94, a bus 95, a CPU 96, a RAM 97, a ROM 98, and a storage block 99. The SPU 93, CPU 96, RAM 97, ROM 98, and storage block 99 are interconnected by the bus 95.

The antenna 91 receives a modulated signal sent from another apparatus (e.g., reader/writer 31) and forwards the received signal to the demodulation block 92. Also, through noncontact proximity wireless communication, the antenna 91 transmits the modulated signal coming from the load modulation block 94.

The demodulation block 92 demodulates the modulated signal from the antenna 91, and forwards the command or other data acquired from the demodulation to the SPU 93. The SPU 93 decodes the command or other data coming from the demodulation block 92 and feeds the decoded data to the CPU 96 via the bus 95. Also, the SPU 93 encodes the command or other data supplied from the CPU 96 via the bus 95 and forwards the encoded data to the load modulation block 94. The load modulation block 94 gets the command or other data from the SPU 93 modulated by load in keeping with electromagnetic waves coming from another apparatus, and sends the load-modulated data to the antenna 91.

The CPU 96 performs the creation process (to be discussed later in reference to FIG. 8) by loading a relevant program from the ROM 98 or storage block 99 into the RAM 97 for execution.

While the CPU 96 is performing diverse processes, the RAM 97 temporarily accommodates halfway data that may occur during the processing. The ROM 98 stores various programs and data to be used by the CPU 96 for carrying out its processes.

The storage block 99 is composed of a so-called nonvolatile storage medium such as an EEPROM. The storage block 99 stores the data designated by the CPU 96 for write operations, the programs used by the CPU 96 for performing diverse processing, and other data.

Figure 1:
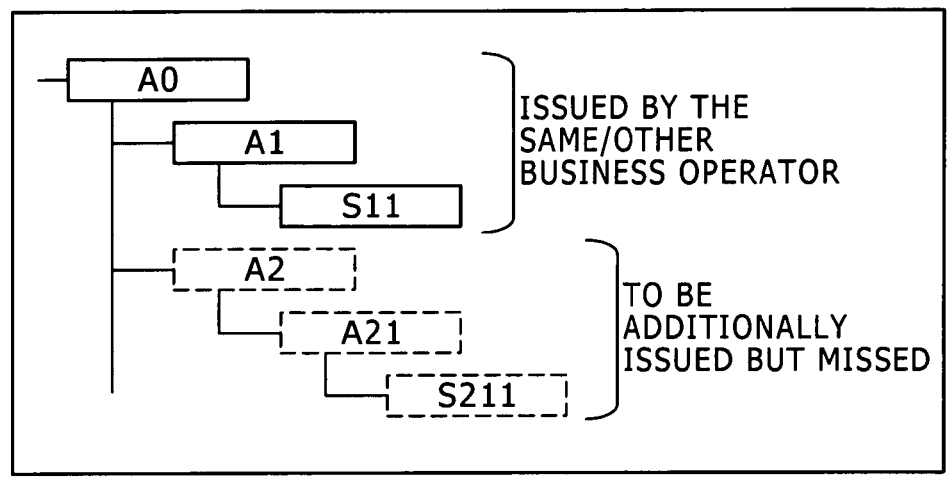
FIG. 1 is a schematic view showing a layer structure of area regions and service regions.

Also, the storage block 99 accommodates area definition information that defines area regions and service definition information that defines service regions. Writing these kinds of information to the storage area of the storage block 99 creates the area regions defined by the area definition information and the service regions defined by the service definition information, as illustrated in FIG. 1.

The area definition information refers to information which includes an area range indicating the range of the corresponding area region, an area code for uniquely identifying the area region in question, an area key for creating an authentication key used for authentication purposes upon access to the area region, a key version of the area key, and an allocation size indicating the size allocated to the area region.

The service definition information refers to information which includes a service code for uniquely identifying the corresponding service area (found in the memory area), a service key for generating an authentication key used for authentication purposes upon access to the service region, a key version of the service key, and an allocation size indicating the size allocated to the service region.

[Explanation of how the Additional Registration Process is Carried Out]

Figure 5:
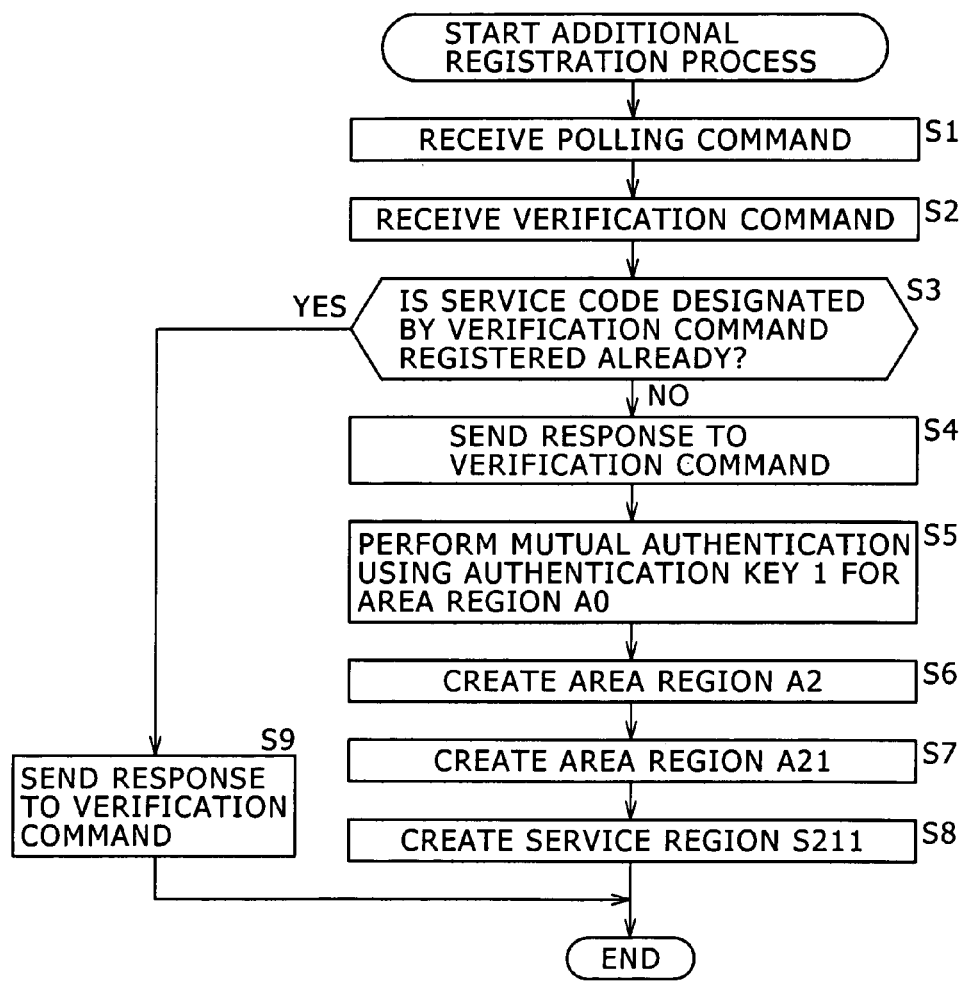
FIG. 5 is a flowchart explanatory of an additional registration process.

Described below in reference to the flowchart of FIG. 5 is the additional registration process performed by the IC card 32 in response to a command from the reader/writer 31. This process is started illustratively when the user holds the IC card 32 over the reader/writer 31.

In step S1 of FIG. 5, the CPU 96 of the IC card 32 receives a polling command from the reader/writer 31 through noncontact proximity wireless communication (via the antenna 91, demodulation block 92, SPU 93, and bus 95). Upon receipt of the polling command, the CPU 96 transmits a response thereto through noncontact proximity wireless communication (via the bus 95, SPU 93, load modulation block 94, and antenna 91).

In turn, upon receiving the response from the CPU 96, the reader/writer 31 transmits a verification command designating the service code of the service region S211.

In step S2, the CPU 96 receives the verification command from the reader/writer 31. The CPU 96 proceeds to determine (i.e., verify) whether the service code designated by the received verification command has already been registered (created) in the memory area of the storage block 99.

If in step S3 the CPU 96 determines that the service code designated by the verification command has yet to be registered in the memory area of the storage block 99, i.e., that the service area S211 has yet to be created, then the CPU concludes that the area regions A21 and A2 which should exist as upper layers of the service region S211 have yet to be created. In this case, control is passed on to step S4.

In step S4, the CPU 96 transmits a response to the verification command, indicating that the service region S211 has yet to be created.

In step S5, the CPU 96 performs mutual authentication with the reader/writer 32 that operates as follows: illustratively, after receiving the response from the CPU 96 in step S4, the reader/writer 32 creates an authentication key for use in an authentication process to be effected to create regions on the lower layer of the area region A0 based on a preinstalled area key to the area region A0. Using the authentication key thus created, the reader/writer 32 executes mutual authentication with the CPU 96.

Following the authentication process performed by the reader/writer 32, the CPU 96 creates an authentication key based on the area key to the area region A0 stored in the storage block 99. Using the authentication key thus created, the CPU 96 carries out mutual authentication with the reader/writer 32.

In the manner described above, mutual authentication is accomplished between the reader/writer 32 and the IC card (CPU 96). Thereafter, the reader/writer 32 transmits an A2 designation command designating the creation of the area region A2.

In step S6, based on the A2 designation command coming from the reader/writer 32, the CPU 96 writes area definition information about the area region A2 to the memory area of the storage block 99 (so as to create the area region A2), and transmits a response to the A2 designation command. In turn, upon receiving the response from the CPU 96, the reader/writer 32 transmits an A21 designation command designating the creation of the area region A21.

In step S7, based on the A21 designation command coming from the reader/writer 32, the CPU 96 writes area definition information about the area region A21 to the memory area of the internal memory (so as to create the area region A21), and transmits a response to the A21 designation command. Upon receipt of the response from the CPU 96, the reader/writer 32 transmits an S211 designation command designating the creation of the service region S211.

In step S8, based on the S211 designation command from the reader/writer 32, the CPU 96 writes service definition information about the service region S211 to the memory area of the storage block 99 (so as to create the service region S211), and transmits a response to the S211 designation command.

If in step S3 the CPU 96 determines that the service code designated by the verification command has already been registered in the memory area of the storage block 99, i.e., that the service region S211 has already been created, then the CPU 96 concludes that the area regions A21 and A2 that should exist as upper layers of the service region S211 have already been created. In this case, control is passed on to step S9.

In step S9, the CPU 96 transmits a response to the verification command, indicating that the service region S211 has already been created. This completes the additional registration process.

[Explanation of how the Recovery Registration Process is Carried Out]

If the additional registration process is stopped halfway within the communication system 1, a recovery registration process is carried out to recover (i.e., create) the regions yet to be created by the additional registration process (specifically, a creation designation process is performed by the reader/writer 31 and a creation process by the IC card 32).

Conceivably, there is another recovery registration process that recovers (i.e., creates) only the regions yet to be created in accordance with the halfway-stopped state of the additional registration process. Although this recovery registration process is not performed by the communication system 1, this process will be explained below as a process that contrasts with the process actually carried out by the communication system 1.

Figure 6:
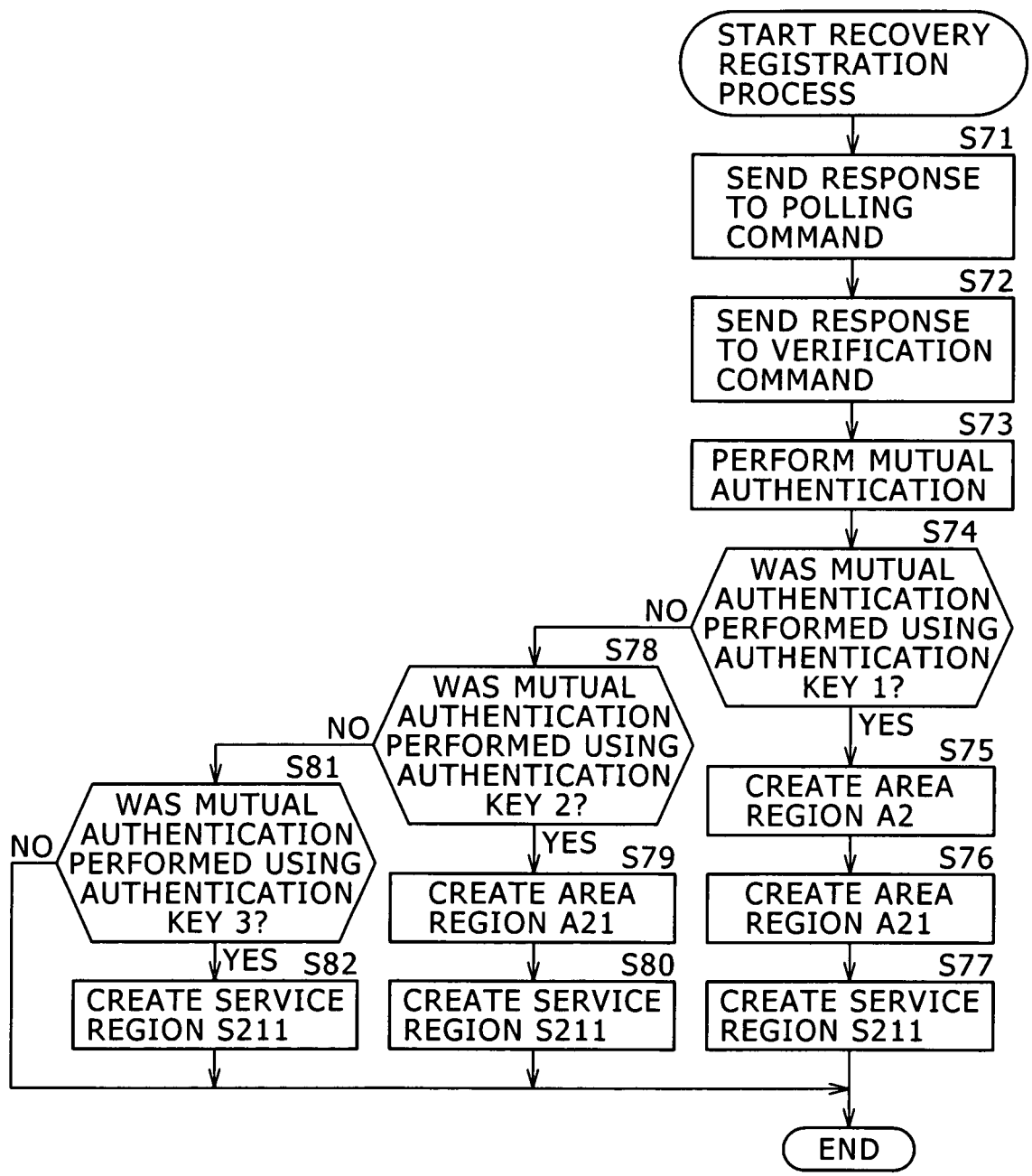
FIG. 6 is a flowchart explanatory of a recovery registration process.

FIG. 6 is a flowchart explanatory of the recover registration process. The entity that performs the recover registration process in FIG. 6 is simply assumed to be an IC card, and the entity that causes the IC card to execute the recovery registration process is simply assumed to be a reader/writer.

The recovery registration process is started illustratively when the user holds the IC card over the reader/writer after the additional registration process is stopped halfway. At this point, the reader/writer transmits a polling command.

In step S71, the IC card receives the polling command from the reader/writer through noncontact proximity wireless communication. The IC card transmits a response to the received polling command through noncontact proximity wireless communication.

In step S72, the IC card transmits a response to a verification command coming from the reader/writer. Illustratively, upon receipt of the verification command designating the area code of the area region A2 from the reader/writer, the IC card determines whether the area code designated by the verification command has already been created in the memory area of the IC card. The IC card proceeds to transmit the result of the determination as its response.

Upon receiving a verification command designating the area code of the area region A21 from the reader/writer, the IC card determines whether the area code designated by the verification command has already been created in the memory area of the IC card. The IC card then transmits the result of the determination as its response.

Upon receiving a verification command designating the service code of the service region A211 from the reader/writer, the IC card determines whether the service code designated by the verification command has already been created in the memory area of the IC card. The IC card then transmits the result of the determination as its response.

In step S73, the IC card performs mutual authentication with the reader/writer in keeping with the transmitted response to the verification command. Illustratively, if the IC card has transmitted the response indicating that the area region A2 does not exist, then the IC card creates an authentication key 1 for authentication purposes based on the area key included in the area definition information about the area region A0 stored in the memory area of the IC card.

The IC card then carries out mutual authentication with the reader writer using the authentication key 1 thus created. This enables the IC card to create the area regions A2 and A21 as well as the service region S211 as the lower layers of the area region A0 in response to a designation command coming from the reader/writer to designate the creation of these regions.

Illustratively, if the IC card has transmitted the response indicating that the area region A2 exists but the area region A21 does not, the IC card creates an authentication key 2 for authentication purposes based on the area key included in the area definition information about the area region A2 stored in the memory area of the IC card.

The IC card then carries out mutual authentication with the reader writer using the authentication key 2 thus created. This enables the IC card to create the area region A21 and service area S211 as the lower layers of the area region A2 in response to a designation command coming from the reader/writer.

Furthermore, if the IC card has transmitted the response indicating that the area regions A2 and A21 exist but the service region S211 does not, the IC card creates an authentication key 3 for authentication purposes based on the area key included in the area definition information about the area region A21 stored in the memory area of the IC card.

The IC card then carries out mutual authentication with the reader writer using the authentication key 3 thus created. This enables the IC card to create the service area S211 as the lower layer of the area region A21 in response to a designation command coming from the reader/writer.

If in step S74 the IC card has performed mutual authentication with the reader/writer using the authentication key 1, then control is passed on to step S75.

In step S75, the IC card writes area definition information about the area region A2 to the memory area of the IC card based on an A2 designation command from the reader/writer (so as to create the area region A2). The IC card then transmits its response to the A2 designation command, and control is passed on to step S76.

In step S76, based on an A21 designation command coming from the reader/writer, the IC card writes area definition information about the area A21 to the memory area of the IC card (so as to create the area region A21). The IC card then transmits its response to the A21 designation command, and control is passed on to step S77.

In step S77, based on an S211 designation command from the reader/writer, the IC card writes service definition information about the service region S211 to the memory area of the IC card (so as to create the service region S211). The IC card then transmits its response to the S211 designation command, and terminates the process.

If in step S74 the IC card has not performed mutual authentication with the reader/writer using the authentication key 1, then control is passed on to step S78.

If in step S78 the IC card has performed mutual authentication with the reader/writer using the authentication key 2, then control is passed on to step S79.

In step S79, as in step S76, the IC card writes the area definition information about the area region A21 to the memory area of the IC card based on the A21 designation command coming from the reader/writer. The IC card then transmits its response to the A21 designation command, and control is passed on to step S80.

In step S80, as in step S77, the IC card writes the service definition information about the service region S211 to the memory area of the IC card based on the S211 designation command coming from the reader/writer. The IC card transmits its response to the S211 designation command, and terminates the process.

If in step S78 the IC card has not performed mutual authentication with the reader/writer using the authentication key 2, then control is passed on to step S81. If in step S81 the IC card has performed mutual authentication with the reader/writer using the authentication key 3, then control is passed on to step S82.

In step S82, as in step S77, the IC card writes the service definition information about the service region S211 to the memory area of the IC card based on the S211 designation command coming from the reader/writer. The IC card proceeds to transmit its response to the S211 designation command.

If in step S81 the IC card has not performed mutual authentication with the reader/writer using the authentication key 3, then the process is terminated. After the above-described steps have been carried out, the recovery registration process is brought to an end.

As discussed above, when the additional registration process is stopped halfway, the recovery registration process is carried out in a manner reflecting the halfway-stopped state of the additional registration process; the regions yet to be created are recovered using the procedure ranging from step S75 to S77, the procedure of steps S79 and S80, or the procedure of step S82.

However, the recovery registration process is complicated because the regions yet to be created are recovered by the different procedures in a manner corresponding to the halfway-stopped state of the additional registration process. By contrast, the communication system 1 is arranged to recover the regions yet to be created by the additional registration process using the same steps as steps S5 through S8 of the additional registration process regardless of the halfway-stopped state of this process.

[Explanation of how the Creation Designation Process is Carried Out]

Figure 7:
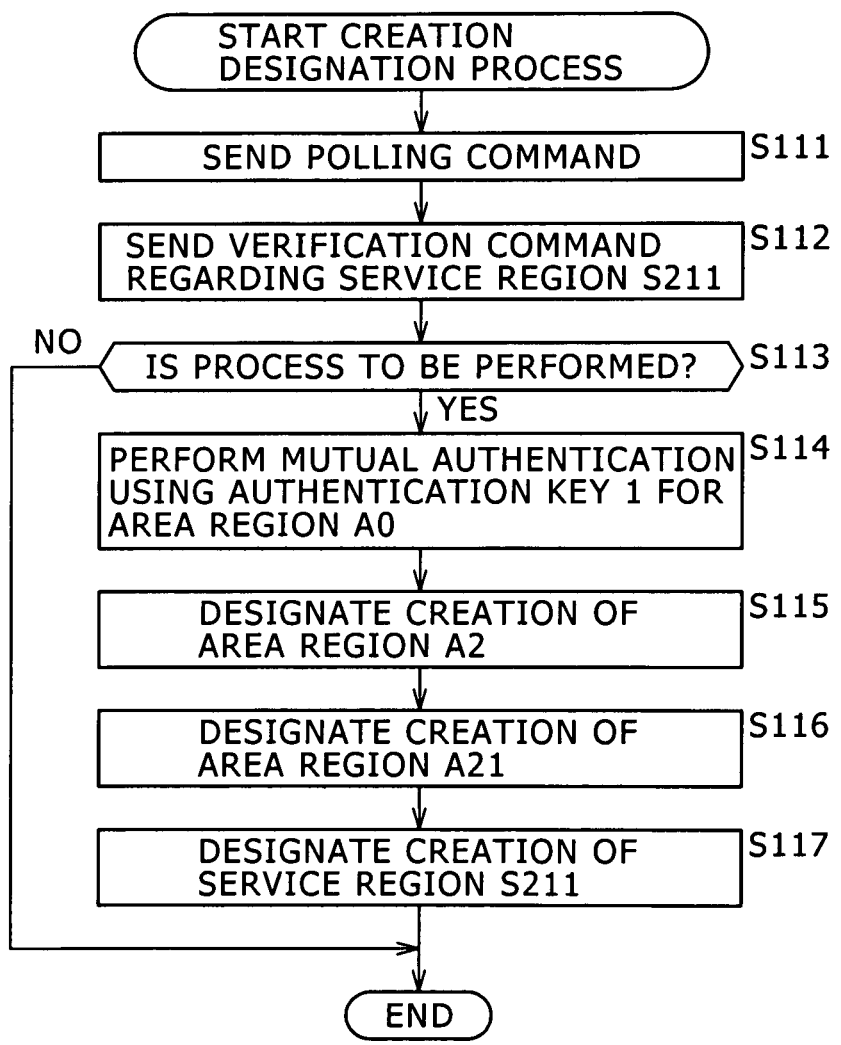
FIG. 7 is a flowchart explanatory of a creation designation process.

FIG. 7 is a flowchart explanatory of details of the creation designation process performed by the reader/writer 31 when the additional registration process is stopped halfway, the reader/writer 31 giving the IC card 32 instructions to recover the regions yet to be created.

In step S111, the CPU 67 generates a polling command and transmits the generated command through noncontact proximity wireless communication (via the bus 66, SPU 63, modulation block 64, and antenna 61). Upon receipt of a response illustratively from the IC card 32 to the polling command (via the antenna 62, demodulation block 62, SPU 63, and bus 66), the CPU 67 goes to step S112.

In step S112, the CPU 67 generates and transmits a verification command designating the service code of the service region S211 whose creation is to be designated in step S117, to be discussed later. Upon receipt from the IC card 32 of a response indicating that the service code designated by the verification command exists, the CPU 67 generates and transmits a verification command designating the service key, key version, and allocation size of the service region S211 whose creation is to be designated in step S117, to be described later.

In step S113, the CPU 67 receives the response sent from the IC card 32. Based on the received response, the CPU 67 determines whether or not to designate the creation of the area regions A2 and A21 and of the service region S211 by carrying out steps s114 through S117.

Illustratively, if the CPU 67 receives the response indicating that the service code designated by the verification command does not exist in the memory area of the IC card 32, or if the response received by the CPU 67 indicates that the service key, key version, and allocation size besides the service code designated by the verification command match the corresponding entries in the memory, then control is passed from step S113 to step S114. Otherwise the creation designation process is brought to an end.

In step S114, the CPU 67 creates a verification key based on the area key to the area region A0 stored beforehand in the storage block 70, and performs mutual authentication with the IC card 32 using the authentication key 1 thus created. This enables the reader/writer 31 to create the area regions A2 and A21 as well as the service region S211 as the lower layers of the area region A0 in the IC card 32.

In step S115, the CPU 67 creates and transmits an A2 designation command designating the creation of the area region A2. Upon receipt from the IC card 32 of a response indicating that the area region A2 has been successfully created, the CPU 67 goes to step S116.

In step S116, the CPU 67 creates and transmits an A21 designation command designating the creation of the area region A21. Upon receipt from the IC card 32 of a response indicating that the area region A21 has been successfully created, the CPU 67 goes to step S117.

In step S117, the CPU 67 creates and transmits an S211 designation command designating the creation of the service region S211. Upon receipt from the IC card 32 of a response indicating that the service region S211 has been successfully created, the CPU 67 terminates the creation designation process.

[Explanation of how the Creation Process is Carried Out]

Figure 8:
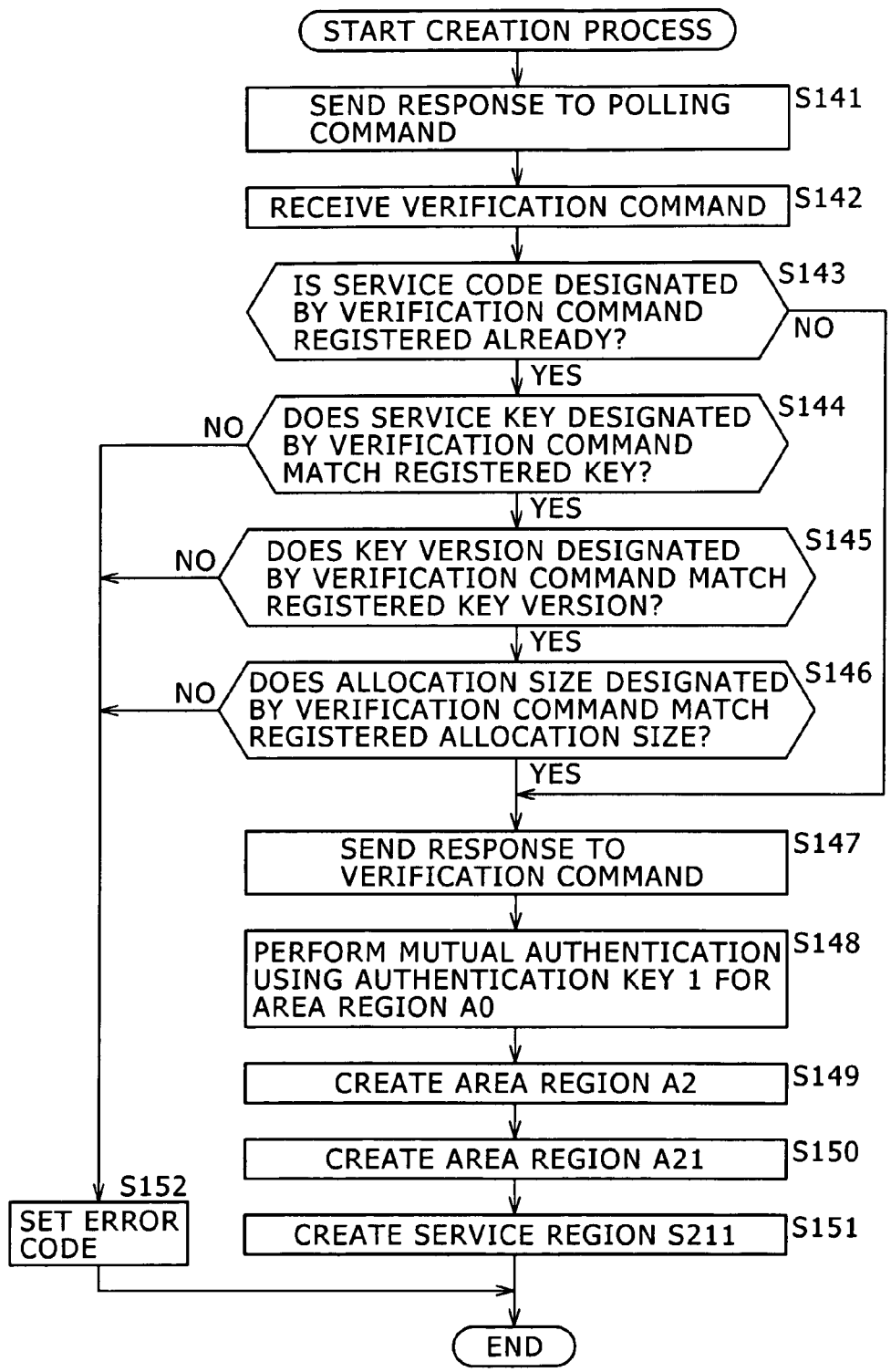
FIG. 8 is a flowchart explanatory of a creation process.

FIG. 8 is a flowchart explanatory of details of the creation process performed by the IC card 32 in response to commands coming from the reader/writer 31. Step S141 is carried out in the same manner as step S71 of the recovery registration process. In step S142, the CPU 96 receives from the reader/writer 31 a verification command designating the service code of the service region S211.

The CPU 96 proceeds to determine whether the service code designated by the received verification command has already been registered in the storage block 99. If the CPU 96 receives from the reader/writer 31 a verification command designating a service key, a key version, and an allocation size, then the CPU 96 determines whether the designated service key, key version, and allocation size match respectively the service key, key version, and allocation size of the service region S211 stored in the memory area of the storage block 99.

In step S143, the CPU 96 determines whether or not the service code of the service region S211 has already been registered in the memory area of the storage block 99, based on the result of the determination in step S142. If the service code of the service region S211 has yet to be registered in the memory area of the storage block 99, then the CPU 96 goes to step S147. The CPU 96 transmits the result of the determination as its response.

If in step S143 the CPU 96 determines that the service code of the service region S211 has already been registered in the memory area of the storage block 99, based on the result of the determination in step S142, then the CPU 96 goes to step S144.

In step S144, the CPU 96 determines whether or not the designated service key matches the registered service key based on the result of the determination in step S142. If the two keys are determined to match one another, then control is passed on to step S145. In step S145, the CPU 96 determines whether the designated key version matches the registered key version based on the result of the determination in step S142. If the two key versions are determined to match one another, then control is passed on to step S146. In step S146, the CPU 96 determines whether the designated allocation size matches the registered allocation size based on the result of the determination in step S142. If the two allocation sizes are determined to match one another, then control is passed on to step S147.

In step S147, the CPU 96 transmits a response to the verification command designating the service code, the response indicating that the service code has already been registered. The CPU 96 also transmits a response to the verification command designating the service key, key version, and allocation size, the response indicating that the service key, key version, and allocation size match those already registered.

In step S148, the CPU 96 creates an authentication key 1 based on the area key to the area region A0 stored beforehand in the storage block 99, and performs mutual authentication with the IC card 32 using the authentication key 1 thus created. This enables the CPU 96 to create the area regions A2 and A21 as well as the service region S211 as the lower layers of the area region A0 in response to commands from the reader/writer 31.

Steps S149 through S151 are carried out in the same manner as steps S75 through S77 of the recovery registration process.

Control is passed on to step S152 if it is determined in step S144 that the designated service key does not match the registered service key, if in step S145 the designated key version does not match the registered key version, or if in step S146 the designated allocation size does not match the registered allocation size.

In step S152, the CPU 96 establishes as its response an error code indicating that one of the service key, key version, and allocation size does not match the corresponding entry, and transmits the response thus established. This brings the creation process to an end.

In the creation designation process, as described above, the reader/writer 31 can designate the IC card 32 to recover the regions yet to be created by the additional registration process using the same steps as steps S5 through S8 of the additional registration process regardless of the halfway-stopped state of this process.

Thus in the creation process, the IC card 32 can recover the regions yet to be created by the additional registration process using the same steps (i.e., steps S148 through S151) as steps S5 through S8 of the additional registration process regardless of the halfway-stopped state of this process.

In the creation process, mutual authentication is performed in step S148 using only one authentication key 1 regardless of the halfway-stopped state of the additional registration process. Because only the area key to the area region A0 is used to generate the authentication key 1 for use in mutual authentication between the reader/writer 31 and the IC card 32, it is easy to manage the keys for generating authentication keys.

Also in the creation process, steps S149 through S151 will not be carried out if it is determined that the service region S211 (i.e., its service code) has already been created and that the service key, key version, and allocation size of the already-created service region S211 do not match those to be created in steps S149 through S151. This protects the already-created service region S211 against erasure by overwriting when that service region S211 differs from a service region S211 to be created in steps S149 through S151.

In the creation process discussed above, it was shown that if the service region S211 (i.e., its service code) has already been created, then a determination is made to determine whether or not the service key, key version, and allocation size of the already-created service region S211 match those to be created in steps S149 through S151. However, the targets to be determined for a match are not limited to those described above.

That is, at least one of the service key, key version, and allocation size may be regarded as the target to be determined for a match. When the target is found to match, the corresponding step among steps S149 through S151 may be carried out.

<2. Variations>

According to the above-described embodiment of the present invention, the creation designation process and creation process are arranged to recover the memory regions yet to be created by the halfway-stopped additional registration process. However, this is not limitative of the present invention.

Alternatively, the creation designation process and creation process may be used for adding new memory regions and, if the steps to create the new regions are stopped halfway, for recovering the regions yet to be added by the halfway-stopped steps. In this case, the regions yet to be created can be recovered using the same steps to add the new memory regions. This makes it possible for many businesses offering new services to add their offerings (i.e., new memory regions) to the IC card 32 in a relatively easy manner.

Also according to the embodiment discussed above, the area regions A2 and A21 as well as the service region S211 are additionally created as the lower layers of the area region A0. Alternatively, the regions to be created anew may be any kinds of regions.

Illustratively, the present invention can be applied to a case in which, besides the area regions A2 and A21 and the service region S211, a service region S212 is to be created anew on the same layer as the service region S211 (i.e., the immediately lower layer to the area region A21).

Where a plurality of memory regions exist on the lowest layer level, a determination may be made on each of these regions to determine whether the region in question has already been created in steps S143 through S146 of the creation process. Steps S148 through S151 may then be carried out in keeping with the result of the determination.

According to the above-described embodiment of the invention, the communication system 1 is made up of the reader/writer 31 and the noncontact IC card 32. Alternatively, the noncontact IC card 32 may be replaced by so-called contact type IC cards.

In this specification, the term "system" refers to an entire configuration made up of a plurality of component devices.

In this specification, the steps describing the programs of interest represent not only the processes that are to be carried out in the depicted sequence (i.e., on a time series basis) but also processes that may be performed parallelly or individually and not necessarily chronologically.

It should be understood by those skilled in the art that various modifications, combinations, sub-combinations and alterations may occur depending on design requirements and other factor in so far as they are within the scope of the appended claims or the equivalents thereof.

What is claimed is:

1. An information processing apparatus comprising:
    storage means for storing a first region as part of a layer structure;
    execution means for performing, in response to a designation command transmitted by a communication apparatus to designate the creation of a second region as a lower layer of said first region, a region creation process for creating said second region as the lower layer of said first region; and
    transmission means for transmitting, if said region creation process is stopped, first information indicating whether or not said second region is already created to said communication apparatus, in response to a request from said communication apparatus;
    wherein, upon receipt of said designation command transmitted by said communication apparatus in response to the transmitted first information indicating that said second region is not created, said execution means performs the region creation process independent of the stopped state of said region creation process.

2. The information processing apparatus according to claim 1, wherein,
- if said second region is determined to be created already, then said transmission means transmits second information in response to a request from said communication apparatus, said second information indicating whether or not region information about said second region matches the region information designated by said communication apparatus; and
- upon receipt of said designation command from said communication apparatus in response to the transmission of said first information indicating that said second region is already created and of said second information indicating that the two kinds of region information match one another, said execution means performs the region creation process independent of the stopped state of said region creation process.

3. The information processing apparatus according to claim 2, wherein said transmission means transmits said second information indicating whether or not said two kinds of region information match one another at least in terms of a key to the already created second region, a key version of said key, or an allocation size denoting the storage capacity of the already created second region.

4. The information processing apparatus according to claim 1, wherein, if said region creation process is performed to create a plurality of said second regions in said layer structure, then said transmission means transmits said first information indicating whether or not the lowest of said plurality of second regions in said layer structure is already created, in response to a request from said communication apparatus.

5. The information processing apparatus according to claim 1, wherein said execution means performs mutual authentication with said communication apparatus based on a key to said first region, before carrying out said region creation process.

6. A non-transitory storage medium on which is recorded a program comprising the step of
- causing a computer to function as:
- storage means for storing a first region as part of a layer structure;
- execution means for performing, in response to a designation command transmitted by a communication apparatus to designate the creation of a second region as a lower layer of said first region, a region creation process for creating said second region as the lower layer of said first region; and
- transmission means for transmitting, if said region creation process is stopped, first information indicating whether or not said second region is already created to said communication apparatus, in response to a request from said communication apparatus;
- wherein, upon receipt of said designation command transmitted by said communication apparatus in response to the transmitted first information indicating that said second region is not created, said execution means performs the region creation process independent of the stopped state of said region creation process.

7. A communication apparatus comprising:
- transmission means for transmitting a designation command for designating the creation of a second region as a lower layer of a first region as part of a layer structure stored in a memory of an information processing apparatus;
- request means for requesting the transmission of first information indicating whether or not said second region is already created if a region creation process performed by said information processing apparatus in response to said designation command to create said second region as the lower layer of said first region is stopped;
- reception means for receiving said first information transmitted in response to the request from said request means; and
- determination means for determining whether or not said second region is already created based on the received first information;
- wherein said transmission means transmits said designation command if said second region is not determined to be created.

8. A non-transitory storage medium on which is recorded a program comprising the step of
- causing a computer to function as:
- transmission means for transmitting a designation command for designating the creation of a second region as a lower layer of a first region as part of a layer structure stored in a memory of an information processing apparatus;
- request means for requesting the transmission of first information indicating whether or not said second region is already created if a region creation process performed by said information processing apparatus in response to said designation command to create said second region as the lower layer of said first region is stopped;
- reception means for receiving said first information transmitted in response to the request from said request means; and
- determination means for determining whether or not said second region is already created based on the received first information;
- wherein said transmission means transmits said designation command if said second region is not determined to be created.

9. An information processing apparatus comprising:
- a storage block configured to store a first region as part of a hierarchical structure;
- an execution block configured such that in response to a designation command transmitted by a communication apparatus to designate the creation of a second region as a lower layer of said first region, said execution block performs a region creation process for creating said second region as the lower layer of said first region; and
- a transmission block configured such that if said region creation process is stopped, then said transmission block transmits first information indicating whether or not said second region is already created to said communication apparatus, in response to a request from said communication apparatus;
- wherein, upon receipt of said designation command transmitted by said communication apparatus in response to the transmitted first information indicating that said second region is not created, said execution block performs the region creation process independent of the stopped state of said region creation process.

10. A communication apparatus comprising:
- a transmission block configured to transmit a designation command for designating the creation of a second region as a lower layer of a first region as part of a layer structure stored in a memory of an information processing apparatus;
- a request block configured to request the transmission of first information indicating whether or not said second region is already created if a region creation process performed by said information processing apparatus in response to said designation command to create said second region as the lower layer of said first region is stopped;
a reception block configured to receive said first information transmitted in response to the request from said request block; and
a determination block configured to determine whether or not said second region is already created based on the received first information;
wherein said transmission block transmits said designation command if said second region is not determined to be created.

* * * * *